United States Patent [19]

Makino et al.

[11] 4,229,328

[45] Oct. 21, 1980

[54] ELECTRICALLY CONDUCTIVE RESIN COMPOSITION

[75] Inventors: Yoshimi Makino; Hidetoshi Shimizu, both of Yokohama, Japan

[73] Assignee: Sony Corporation, Tokyo, Japan

[21] Appl. No.: 964,256

[22] Filed: Nov. 27, 1978

[51] Int. Cl.$^2$ .............................................. C08L 1/14
[52] U.S. Cl. ....................... 260/16; 260/20; 260/37 M; 260/40 R; 260/42.14; 260/42.18; 260/42.22
[58] Field of Search ............... 260/37 M, 40 R, 42.22, 260/42.52, 16, 20, 42.14, 42.18

[56] References Cited

U.S. PATENT DOCUMENTS

| | | | |
|---|---|---|---|
| 3,923,697 | 12/1975 | Ellis | 260/45.52 |
| 4,081,423 | 3/1978 | Hardenfelt | 260/45.52 |

FOREIGN PATENT DOCUMENTS 887693  12/1971  Canada .................................. 260/42.52

*Primary Examiner*—J. Ziegler

*Attorney, Agent, or Firm*—Hill, Van Santen, Steadman, Chiara & Simpson

[57] ABSTRACT

A resin composition includes 20 to 70 parts by weight of unsaturated polyester being radically copolymerizable, having an average molecular weight between 500 and 5000, and having a degree of unsaturation between 150 and 190, 1 to 25 parts by weight of thermoplastic resin having an average molecular weight between $10^4$ and $10^7$, 30 to 70 parts by weight of ethylenically unsaturated compound being radically reactive with said unsaturated polyester resin and being able to dissolve said unsaturated polyester and said thermoplastic resin, on the basis of the total amount of said unsaturated polyester resin, said thermoplastic resin and said ethylenically unsaturated compound being 100 parts by weight, 0.05 to 1.0 parts by weight of fiber-like conductive material having a length between 1 and 10 millimeters and an aspect ratio between 2 and $10^3$, and not more than 40 parts by weight of granular conductive material having a diameter between 10 and 300 microns, on the basis of the total amount of said unsaturated polyester resin, said thermoplastic resin and said ethylenically unsaturated compound being 100 weight parts.

13 Claims, 2 Drawing Figures

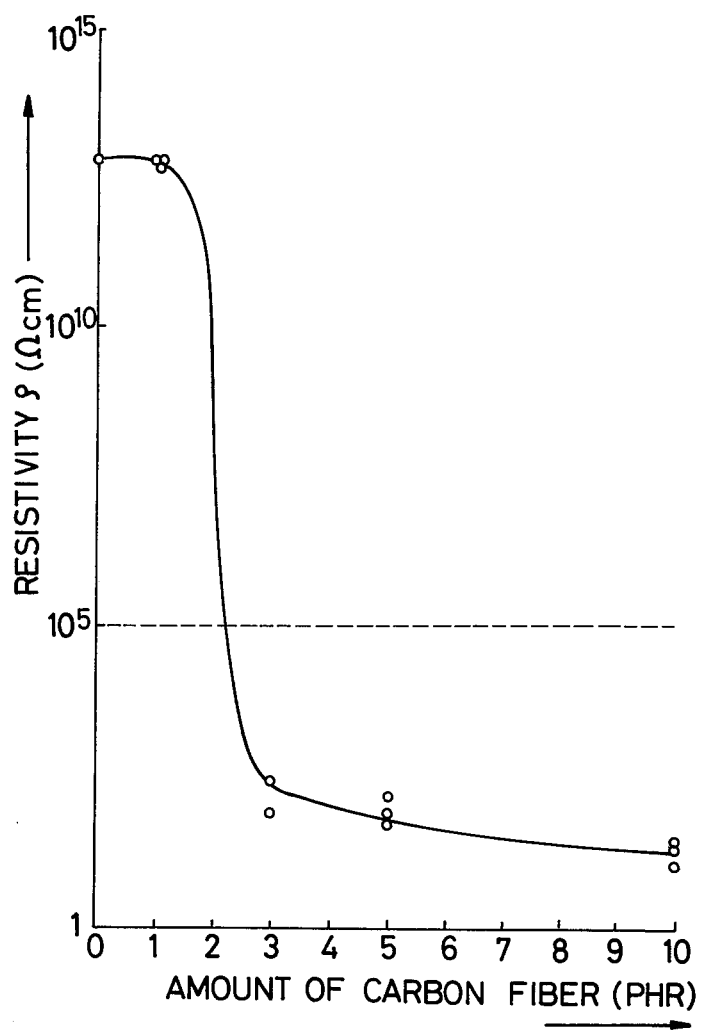

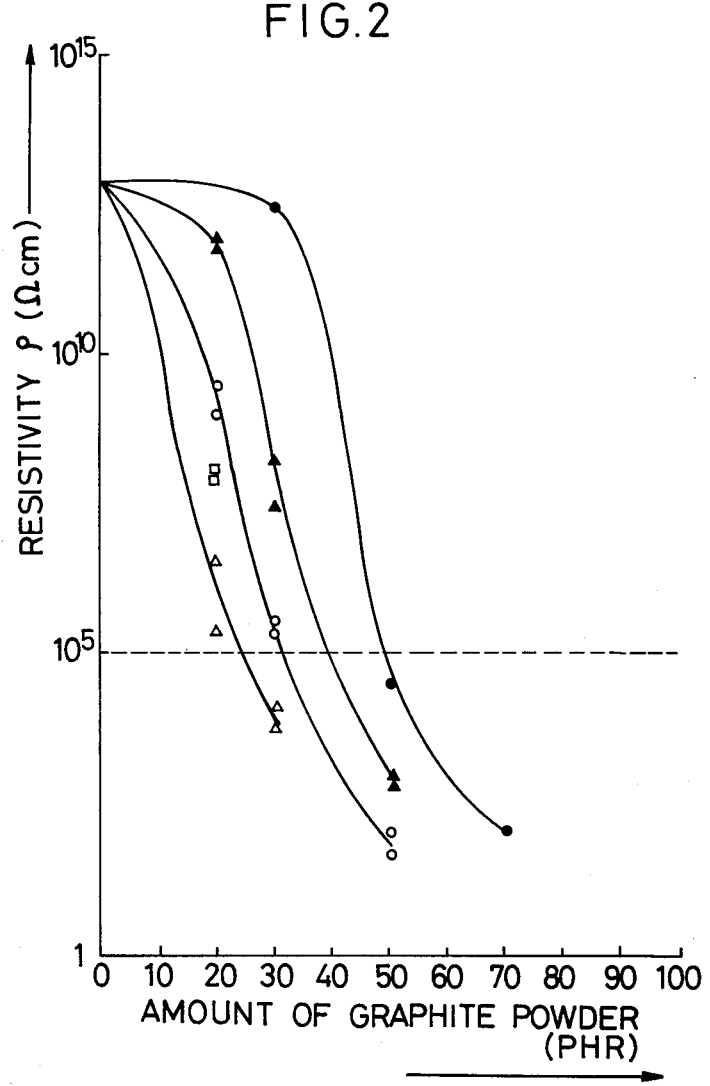

ELECTRICALLY CONDUCTIVE RESIN COMPOSITION

BACKGROUND OF THE INVENTION

1. Field of the Invention

This invention relates to an electrically conductive resin composition, and more particularly to an electrically conductive resin composition containing a redically copolymerizable unsaturated polyester resin which is known as "Bulk Molding Compound".

2. Description of the Prior Art

A radically copolymerizable resin such as unsaturated polyester resin which is known as "Bulk Molding Compound", to which different filling materials are added, is effectively used for a cabinet of a record player, a turntable thereof and so on. However, electric resistivity of the radically copolymerizable resin such as the unsaturated polyester resin is as high as $10^{13}$ $\Omega$cm. Accordingly, an electrically conductive material is added to the radically copolymerizable resin to impart some electrical conductivity to the latter and to obtain antistatic effect.

A granular conductive material such as carbon powder and metal powder, or fiber-like conductive material such as carbon fiber is used as the electrically conductive material for the above resin. Since the granular conductive material alone or the fiber-like conductive material along is added as the electrically conductive material to the resin, the following defects cannot be avoided.

A large amount of the granular or fiber-like conductive material should be added to the resin to obtain a desired low electrical resistance. As the result, the relative content of the resin is reduced, and so the mechanical strength of the produced resin composition is lowered. Since the fiber-like conductive material is expensive, it is economically disadvantageous to add the large amount of the fiber-like conductive material.

OBJECT AND SUMMARY OF THE INVENTION

An object of this invention is to provide an electrically conductive resin composition which overcomes the defects of the above described prior art.

Another object of this invention is to provide a resin composition whose resistivity is effectively reduced by a little amount of an electrically conductive material.

A further object of this invention is to provide an electrically conductive resin composition which is improved in mechanical strength.

A still further object of this invention is to provide an electrically conductive resin composition which is superior in mechanical strength, and has a low coefficient of shrinkage in molding operation.

According to one aspect of the present invention, there is provided a resin composition including: 20 to 70 parts by weight of unsaturated polyester being radically copolymerizable, having an auerage molecular weight between 500 and 5000, and having a degree of unsaturation between 150 and 190; 1 to 25 parts by weight of thermoplastic resin having an average molecular weight between $10^4$ and $10^7$; 30 to 70 parts by weight of ethylenically unsaturated compound being radically reactive with said unsaturated polyester resin and being able to dissolve said unsaturated polyester and said thermoplastic resin; on the basis of the total amount of said unsaturated polyester, said thermoplastic resin and said ethylenically unsaturated compound being 100 parts by weight, 0.05 to 1.0 parts by weight of fiber-like conductive material having a length between 1 and 10 millimeters and an aspect ratio between 2 and $10^3$; and not more than 40 parts by weight of granular conductive material having a diameter between 10 and 300 microns.

The above described resin composition has a desired electrical resistance and a satisfactory mechanical strength. The cost can be widely reduced.

Various other objects, advantages and features of the present invention will become readily apparent from the ensuing detailed description, and the novel features will be particularly pointed out in the appended claims.

BRIEF DESCRIPTION OF THE DRAWINGS

FIG. 1 is a graph showing the relationship between an amount of carbon fiber and resistivity $\rho(\Omega\text{cm})$ in a prior art resin composition in which carbon fiber alone is added as an electrically conductive material; and FIG. 2 is a graph showing the relationships between amounts of graphite powder and resistivities $\rho$ in different resin compositions according to this invention in which different amounts of carbon fibers are further added.

DESCRIPTION OF THE PREFERRED EMBODIMENT

Before proceeding with a detailed description of this invention, and for the purpose of clearly contrasting therewith, there will be described a conventional resin composition in which carbon fiber alone is added as an electrically conductive material, with reference to FIG. 1. The added carbon fiber has the length of 3 millimeters. Generally, it is required for antistatic effect that resistivity of the resin composition is lower than $10^8$ $\Omega$cm. It will be understood from FIG. 1 that more than 3 PHR (parts by weight on the basis of the total resinuous material being 100 parts by weight) of carbon fiber should be added for obtaining a resistivity of lower than $10^5$ $\Omega$cm. Such a resin composition is costly. Even when carbon fiber having the length of 6 mm is used as the electrically conductive material, similarly a large amount of carbon fiber should be added for obtaining the desirable low resistivity.

An electrically conductive resinuous composite according to this invention basically consists of a radically copolymerizable resin such as an unsaturated polyester resin, an ethylenically unsaturated monomer reactive with the radically copolymerizable resin to dissolve the latter, a thermoplastic resin for imparting low coefficient of contraction to the composite, and an electrically conductive material. An occasion demands, an inorganic reinforcing material such as glass fiber, talc or $CaCO_3$, and other additives such as coloring agent, die lubricant and thickening agent may be added into the electrically conductive resinuous composite according to this invention. Further, it is preferable to use an azo catalyst as a polymerization initiator for hardening of the resinuous composite according to this invention.

In this invention, electrically conductive fiber-like and granular materials are used together as the above described electrically conductive material. Examples of the electrically conductive granular material usable for this invention are carbon powder, graphite powder, and metal powder such as Fe, Cu and Al powder. It is preferable that the grain size of the electrically-conductive powder is within the range of 10 to 300 microns. For example, KS-44 (tradename: manufactured by LONZA CO., LTD.) may be used as the electrically-conductive powder having the preferable grain size. Its grain size, specific resistivity and density are 44 microns, $1.6 \times 10^{-3}$ to $9.6 \times 10^{-3}$ $\Omega$cm, and 2.25 g/cm$^3$, respectively. Similarly, KS-2.5, KS-15, KS-75 or T-type (all tradenames: manufactured by the same comany) may be used as any other graphite powder. These materials are artificial. Of course, a natural material may be used for this invention. According to this invention, not more than 40 parts by weight of graphite powder are added to 100 parts by weight of the total resinuous material of the unsaturated polyester resin, ethylenically unsaturated monomer and thermoplastic resin. It is preferable that the added amount of graphite powder is within the range of 10 to 40 parts by weight.

Examples of the electrically conductive fiber-like material usable for this invention are carbon fiber, glass fiber plated with metal such as nickel or coated with metal such as aluminium or zinc, and metal whisker. The aspect ratio (ratio of length to diameter) of the electrically-conductive fiber-like material usable for this invention is within the range of 2 to $10^3$.

It is preferable that 0.05 to 1.0 parts by weight of the electrically-conductive fiber-like material are mixed with 100 parts of resinuous materials (unsaturated polyester resin, ethylenically unsaturated monomer and thermoplastic resin). When the mixed amount of the electrically-conductive fiber-like material is less than 0.05 parts by weight, the electrically-conductive granular material such as graphite powder should be mixed so much with the resinuous materials. When the mixed amount of the electrically-conductive fiber is more than 1.0 parts by weight, the electrically conductive resinuous composite becomes expensive and so is disadvantageous in cost. When carbon fiber is used as the electrically conductive fiber-like material for this invention, it is preferable that its length is within the range of 1 to 10 mm. When its length is less than 1 mm, the carbon fiber is apt to break, and so a desirable effect can be little expected. Torayca T-008-006 (tradename: manufactured by Toray Industries Inc. fiber length: 6 mm) or Torayca T-008-003 (tradename: manufactured by the same company. fiber length: 3 mm) may be used as the carbon fiber for this invention. Their specific resistivity and density are $1.8 \times 10^{-3}$ $\Omega$cm and 1.78 g/cm$^3$, respectively. A starting material for them is acryl fiber. Further, rayon, pitch group fiber, phenol group fiber, lignin PVA group fiber may be used as the starting material as the carbon fiber.

The unsaturated polyester usable for this invention is produced by reaction of an unsaturated dicarboxylic acid, polyhydric alcohol, and as occasion demands, a saturated dicarboxylic acid. The unsaturated polyester is linear. Examples of the unsaturated dicarboxylic acid are maleic anhydride, itaconic acid and citraconic acid. Examples of the polyhydric alcohol are ethylene glycol, diethylene glycol, propylene glycol, buthylene glycol, neopentyl glycol, trimethylolethane, trimethylolpropane, hexane triol and pentaerythritol. Examples of the saturated dicarboxylic acid are terephthalic acid, isophthalic acid, phthalic anhydride, tetrahydrophthalic anhydride, adipic acid and sebacic acid. Or the unsaturated polyester may be produced by ring-opening reaction of alkylene oxide.

It is preferable that the average molecular weight of the unsaturated polyester is within the range of 500 to 5000 in consideration of dissolubility into the monomer. It is more preferable that the average molecular weight of the unsaturated polyester is within the range of 700 to 2000. And it is preferable that the unsaturation degree of the unsaturated polyester is within the range of 150 to 190 from the viewpoint of reactivity. The unsaturation degree means a molecular weight per one double bond ($>C=C<$). Namely, the unsaturation degree $$= \frac{\text{average molecular weight}}{\text{number of double bonds in molecule}}.$$

According to this invention, the unsaturated polyester is used together with a liquid of an ethylenically unsaturated monomer. Examples of the ethylenically unsaturated monomers are styrene, vinyltoluene, chlorostyrene, lower alcohol ester of methacrylic acid, 1,3-butanediol dimetaacrylate, diarylphthalate and a mixture of two or more of them.

A thermoplastic resin is used to impart a low coefficient of contraction or shrinkage to the produced unsaturated polyester resin mold. Example of the thermoplastic resins usable for this invention are homopolymers of methylmethacrylate, ethylmethacrylate, buthylmethacrylate, methylacrylate and ethylacrylate, a copolymer of methylmethacrylate with lower alkyl ester of acrylic acid and/or methacrylic acid, copolymers of methylmethacrylate with a little of one or more kinds of laurylmethacrylate, isobornylmethacrylate, acryl amide, hydroxyethylmethacrylate, styrene, 2-ethylhexylacrylate, acrylonitrile, methacrylic acid, methacryl amide, methylolacryl amide, and cetyl stearyl methacrylate, styrene-acrylonitrile copolymer, vinyl chloride-vinyl acetate copolymer, cellulose acetate buthylate, and cellulose acetate propionate.

It is preferable that the molecular weight of the thermoplastic resin to impart a low coefficient of shrinkage is larger, and is within the range of $10^4$ to $10^7$.

When the total amount of the unsaturated polyester resin, ethylenically unsaturated compound and thermoplastic resin is 100 parts by weight, it is preferable that the amount of the unsaturated polyester resin is 20 to 70 parts by weight, that of the ethylenically unsaturated compound is 30 to 70 parts by weight, and that of the thermoplastic resin is 1 to 25 parts by weight, in consideration of moldability and low coefficient of shrinkage.

According to this invention an azo catalyst is used as the radical copolymerization initiator. Examples of the azo catalysts are 2,2'-azobis-isobutyl-carbonitrile, 2,2'-azobis-2,4-dimethylvaleronitrile having the following structural formula (a), 2,2'-azobis-4-methoxy-2,4-dimethylvaleronitrile, 2-phenylazo-2,4-dimethyl-4-methoxyvaleronitrile having the following formula (b), 2-cyano-2-propylazoformide having the following structural formula (c), and 1,1'-azobiscyclohexane-1-carbonitrile having the following structural formula (d):

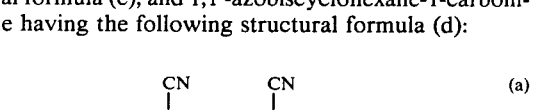

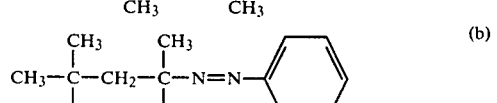

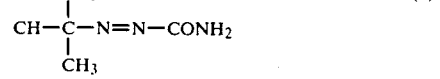

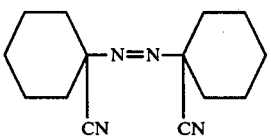
(d)

The oxidation of the above described electrically conductive material (reducing material) is prevented by use of the azo catalyst. Accordingly, three-dimensional crosslinking of the unsaturated polyester is not hindered, and the unsaturated polyester can be satisfactorily hardened, and well molded. When a peroxide group catalyst such as tertiary buthyl peroxy benzoate is used instead of the azo catalyst, the reducing material as the conductive material is oxidized to prevent the three dimensional crosslinking of the unsaturated polyester. Particularly, when the added amount of the reducing material is too much, the unsaturated polyester cannot be satisfactorily hardened. The moldability is deteriorated.

It is preferable that 0.1 to 3 parts by weight of the azo catalyst are used for 100 parts by weight of the total resinuous material.

Examples of inorganic fillers usable together with the resinuous composition according to this invention are calcium carbonate, barium sulfate, magnesium carbonate, clay, silica and talc. Examples of the thickening agents agents usable for this invention are magnesium oxide and surface-activated silica. Examples of the die lubricants usable for this invention are zinc stearate, sodium oleate and silicone.

The above described ingredients are mixed with each other in predetermined ratio. The mixture is poured into a metal mold for pressure-heat molding, and it is hardened there at the temperature of 130° to 170° C. and the pressure of 10 to 100 kg/cm².

Next, there will be described one embodiment of this invention.

A premixed molding compound having the following ingredients was prepared:

| | |
|---|---|
| Resinuous material | 100 parts by weight |
| Graphite powder (Electrically conductive material) | 30 parts by weight |
| Carbon fiber (Electrically conductive material) | 0.5 parts by weight |
| 1,1'- azobiscyclohexane-1-carbonitrile (Azo group catalyst) | 1 part by weight |
| Magnesium oxide (MgO) (Thickening agent) | 10 parts by weight |
| Zinc stearate (Die lubricant) | 4 parts by weight |

KS-44 (grain size: 44μ) was used as the graphite powder, and T-008-003 (length: 3 mm) was used as the carbon fiber. The following materials (A) and (B) were used as the above resinuous material.

(A) "POLYMAL 9607" (Tradename: manufactured by Takeda Chemical Industries Ltd.). It consists of 67 percents by weight of unsaturated polyester having the average molecular weight of about 1000, the unsaturation degree of 165, the acid value of less than 70, and 33 percents by weight of styrene.

(B) "POLYMAL 9761" (Tradename: manufactured by Takeda Chemical Industries Ltd.). It consists of 33 percents by weight of thermoplastic acrylic polymer having the average molecular weight of $10^5$ and 67 percents by weight of styrene.

60 parts by weight of the above described material (A) and 40 parts by weight of the above described material (B) were used as the 100 parts by weight of the resinuous material.

The thus prepared premixed molding compound was poured into the metal mold for pressure-heat molding, and it was molded at the temperature of 150° C. and the pressure of 50 kg/cm². It was satisfactorily hardened, and superior in moldability. The produced mold resin was not defective. Although the added amounts of the graphite powder and carbon fiber were little, a desired low electric resistance was obtained for the resin composition. The resin composition was superior in mechanical strength and lubrication.

The relationships between the resistivities $\rho(\Omega cm)$ and the amounts of the graphite powder were tested on different samples containing 0.02, 0.5 and 1.0 parts by weight (PHR) of the carbon fiber having the length of 3 mm for 100 parts by weight of the resinuous material, and containing 0.1 PHR of the carbon fiber (T-008-006) having the length of 6 mm for 100 parts by weight of the resinuous material, respectively. The test results are shown in FIG. 2. In FIG. 2, black circle marks ● represent data for the sample containing O PHR of, or no carbon fiber, black triangle marks ▲ represent data for the sample containing 0.2 PHR of carbon fiber having the length of 3 mm, white circle marks ○ represent data for the sample containing 0.5 PHR of carbon fiber having the length of 0.3 mm, white triangle marks △ represent data for the sample containing 1.0 PHR of carbon fiber having the length of 0.3 mm, and white square marks □ represent data for the sample containing 0.1 PHR of carbon fiber having the length of 6 mm. The resistivities of the samples all were about $10^{13}$ $\Omega$cm at the amount of graphite powder=0.

It will be understood from FIG. 2 that a desired resistivity, for example, of lower than $10^5$ $\Omega$cm can be obtained in the case when the added amount of carbon fiber having the length of 3 mm is as little as 0.2 to 1.0 PHR, and the added amount of graphite powder is not more than 40 PHR. In the conventional case when no carbon fiber is mixed, the added amount of graphite powder should be more than 50 PHR in order to obtain the desired low resistivity.

From FIG. 1 representing the case when carbon fiber alone is used as the electrically conductive material, it will be understood that the added amount of carbon fiber should be more than 3.0 PHR in order to obtain the desired low resistivity. However, according to this embodiment, the added amount of carbon fiber can be reduced to less than one third of the above added amount for the same desired low resistivity. Further, it will be understood from FIG. 2 that 0.1 PHR of carbon fiber having the length of 6 mm longer than 3 mm decreases further more the resistivity than 0.5 PHR of carbon fiber having the length of 3 mm, for the same amount of graphite powder, although 0.1 PHR is less than 0.5 PHR.

In comparison with the conventional case when the graphite powder alone is used as the electrically-conductive material, the electric resistivity can be satisfactorily reduced to the desired value by adding not more than 40 PHR of graphite power and a little of preferably 0.2 to 1.0 PHR of carbon fiber having the length of 3 mm. It will be further understood that, when the carbon fiber having the length of 6 mm is used, the added amount of the carbon fiber can be greatly decreased in comparison with case when the carbon fiber having the length of 3 mm is used.

As above described, according to this invention, since both the electrically-conductive granular material and the electrically-conductive fiber-like material are mixed in the resinuous material, the required amounts of not only the conductive granular material but also the conductive fiber-like material can be greatly decreased for the desired resistivity in comparison with the case when the electrically-conductive granular material alone or the electrically-conductive fiber-like material alone is mixed as the electrically-conductive material in the resinuous material. Accordingly, since the required amount of the electrically-conductive granular material is so little, the produced resin composition is superior in mechanical strength. Further, since the required amount of the electrically-conductive fiber-like material is greatly reduced, the cost of the resin compound can be reduced much.

Further, according to this invention, it is possible to freely adjust the specific gravity of the resin composition. The specific gravity of the resinuous material itself is about 1.0, and that of graphite is 2.7. Accordingly, the specific gravity of the resin composition can be decreased more, according as the amount of the graphite powder is reduced. Thus, it can be controlled in accordance with the amount of the graphite powder. Further, the graphite powder imparts some lubrication ability or smoothness to the resin composition.

While the invention has been particularly shown and described with reference to the drawings, it will be understood by those skilled in the art that various changes in form and details may be made therein without departing from the spirit and scope of the invention.

What is claimed is:

1. A resin composition comprising:
   (A) 20 to 70 parts by weight of an unsaturated polyester being radically copolymerizable, having an average molecular weight between 500 and 5000, and having a degree of unsaturation between 150 and 190,
   (B) 1 to 25 parts by weight of a thermoplastic resin having an average molecular weight between $1\times10^4$ and $1\times10^7$,
   (C) 30 to 70 parts by weight of a liquid of at least one ethylenically unsaturated monomer being radically reactive with said unsaturated polyester and being able to dissolve said unsaturated polyester and said thermo-plastic resin,
   (D) 0.05 to 1.0 parts by weight of an electrically conductive fiber-like material having a length between 1 and 10 millimeters and an aspect ratio between 2 and $10^3$, on the basis of the total amount of said unsaturated polyester, said thermoplastic resin and said ethylenically unsaturated compound being 100 parts by weight; and
   (E) not more than 40 parts by weight of an electrically conductive powder material having a diameter between 10 and 300 microns, on the basis of the total amount of said unsaturated polyester, said thermo-plastic resin and said ethylenically unsaturated compound being 100 parts by weight.

2. A resin composition according to claim 1, in which an average molecular weight of said unsaturated polyester is between 700 and 2000.

3. A resin composition according to claim 1, in which said conductive fiber-like material is the one or more selected from carbon fiber, glass fiber plated with metal, glass fiber coated with metal, and metal whisken.

4. A resin composition according to claim 1, in which said conductive powder material is the one or more selected from carbon powder, graphite powder and metal powder.

5. A resin composition according to claim 1, further comprising 0.1 to 3.0 parts by weight of an azo catalyst as a radical initiator, on the basis of the total amount of said unsaturated polyester, said thermoplastic resin and said ethylenically unsaturated compound being 100 parts by weight, and said azo catalyst being selected from the group consisting of 2,2'-azobis-isobutyl-carbonitrile, 2,2'-azobis-2,4-dimethylvaleronitrile, 2,2'-azobis-4-methoxy-2,4-dimethylvaleronitrile, 2-phenylazo-2,4-dimethyl-4-methoxyvaleronitrile, 2-cyano-2-propylazoformide, and 1,1'-azobiscyclohexane-1-carbonitrile.

6. A resin composition according to claim 1, in which said unsaturated polyester is produced by reaction of unsaturated dicarboxylic acid and polyhydric alcohol, said unsaturated dicarboxylic acid being selected from maleic anhydride, itaconic acid and citraconic acid, and said polyhydric alcohol being selected from ethylene glycol, diethylene glycol, propylene glycol, buthylene glycol, neopentyl glycol, trimethylolethane, trimethylolpropane, hexanetriol and pentaerythritol.

7. A resin composition according to claim 1, in which said unsaturated polyester is produced by reaction of unsaturated dicarboxylic acid, polyhydric alcohol and saturated dicarboxylic acid, said unsaturated dicarboxylic acid being selected from maleic anhydride, itaconic acid and citraconic acid, said polyhydric alcohol being selected from ethylene glycol, diethylene glycol, propylene glycol, buthylene glycol, neopentyl glycol, trimethylolethane, trimethylolpropane, hexanetriol and pentaerythritol, and said saturated carboxylic acid being selected from terephthalic acid, isophthalic acid, phthalic anhydride, tetrahydrophthalic anhydride, adipic acid and sebacic acid.

8. A resin composition according to claim 1, in which said ethylenically unsaturated monomer is selected from styrene, vinyltoluene, chlorostyrene, lower alcohol ester of methacrylic acid, 1,3-buttanediol dimetaacrylate, diacrylphthalate and a mixture of two or more of them.

9. A resin composition according to claim 1, in which said thermoplastic resin is selected from homopolymers of methylmethacrylate, ethylmethacrylate, buthylmethacrylate, methylacrylate and ethylacrylate, a copyrymer of methylmethacrylate with lower alkyl ester of acrylic acid and/or methacrylic acid, copolymers of methylmethacrylate with a little of one or more kinds of laurylmethacrylate, isobornylmethacrylate, acryl amide, hydroxyethylmethacrylate, styrene, 2-ethyl-hexylacrylate, acrylonitrile, methacrylic acid, methacryl amide, methylol acryl amide, and cetyl stearyl methacrylate, styrene-acrylonitrile copolymer, vinyl chloride-vinyl acetate copolymer, cellulose acetate buthylate, and cellulose acetate propionate.

10. A resin composition according to claim 1, in which said resin composition has a resistivity of less than $10^8$ ohms-cm.

11. A resin composition according to claim 1, in which the added amount of said conductive powder material is 10 to 40 parts by weight on the basis of the total amount of said unsaturated polyester resin, said thermoplastic resin and said ethylenically unsaturated compound being 100 parts by weight.

12. A resin composition according to claim 3, in which said conductive fiber-like material is carbon fiber.

13. A resin composition according to claim 4, in which said conductive powder material is graphite.

* * * * *